(12) United States Patent
Finney et al.

(10) Patent No.: US 6,952,350 B2
(45) Date of Patent: Oct. 4, 2005

(54) PORTABLE ELECTRONIC DEVICE INCLUDING AN ACOUSTIC CHAMBER

(75) Inventors: Benjamin M. Finney, Barrington, IL (US); Giles T. Davis, Mundelein, IL (US); Joseph H. Luniak, Mundelein, IL (US); Sen Yang, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 418 days.

(21) Appl. No.: 10/383,969

(22) Filed: Mar. 7, 2003

(65) Prior Publication Data

US 2005/0168958 A1    Aug. 4, 2005

(51) Int. Cl.[7] ........................... H04M 1/00; H05K 1/00; H05K 1/18; H05K 7/02; H05K 7/06
(52) U.S. Cl. .................................. 361/748; 455/575.1
(58) Field of Search ................................. 361/728, 736, 361/742, 748, 752, 758, 760, 801, 802, 804, 361/807, 809; 455/90.1, 90.2, 90.3, 95, 550.1, 455/575.1; 181/198, 199; 362/24

(56) References Cited

U.S. PATENT DOCUMENTS

| | | | | |
|---|---|---|---|---|
| 5,963,434 A | * | 10/1999 | Jonsson et al. | 361/814 |
| 6,006,118 A | * | 12/1999 | Stephenson | 455/575.1 |
| 2003/0027589 A1 | * | 2/2003 | Wennemer et al. | 455/550 |
| 2003/0100273 A1 | * | 5/2003 | Pedersen et al. | 455/90 |
| 2003/0164918 A1 | * | 9/2003 | Kela et al. | 349/149 |
| 2004/0176048 A1 | * | 9/2004 | Klinghult et al. | 455/90.3 |
| 2004/0263359 A1 | * | 12/2004 | Hampton et al. | 341/22 |

* cited by examiner

Primary Examiner—Phuong T. Vu
(74) Attorney, Agent, or Firm—Matthew C. Loppnow

(57) ABSTRACT

An electronic device. The electronic device can include a frame including at least one aperture, the frame having a first side and a second side, an audio source located on the second side of the frame, and a front housing including a lightguide. The front housing can include a front first side and a back second side opposite the first front side, the back second side facing the first side of the frame. The front housing and the frame can create an acoustic chamber for the audio source.

20 Claims, 5 Drawing Sheets

PORTABLE ELECTRONIC DEVICE INCLUDING AN ACOUSTIC CHAMBER

BACKGROUND OF THE INVENTION

1. Field of Invention

The present invention is directed to a portable electronic device including an acoustic chamber. More particularly, the present invention is directed to a mobile communication device including a lightguide and an acoustic chamber.

2. Description of Related Art

Presently, portable electronic devices, such as portable phones, personal digital assistants, portable games, personal media players, or the like, provide a variety of functions for a user. These functions can include multimedia functions, gaming functions, and other functions that provide an audible signal to the user. For example, a portable game may generate audio signals to enhance the gaming experience.

Unfortunately, the audio source on a portable electronic device does not produce desired quality audio signals. For example, a portable electronic device must be relatively small to be portable. Thus, size restrictions limit the available space on the portable electronic device. This limited space only allows for a relatively small audio source, which cannot produce desired quality audio signals. In particular, the audio signals produced by a small audio source are relatively weak in volume. Furthermore, the audio signals produced by a small audio source are of limited bandwidth, which results in poor tone quality.

Portable electronic devices can also include light sources for illuminating portions of the portable electronic devices. For example, a portable phone may include light sources for illuminating a keypad on the portable phone. Unfortunately, numerous light sources must be used to sufficiently illuminate desired portions of the portable electronic device. Numerous light sources are often necessary because a single light source is inefficient at sufficiently illuminating adequate portions of a portable electronic device. These numerous light sources can take up an unnecessary amount of precious space in a portable electronic device.

Thus, there is a need for a portable electronic device that efficiently utilizes space for illumination functions. Also, there is a need for a portable electronic device that efficiently utilizes space for an audio source. Additionally, there is a need for a portable electronic device that produces improved audio signal quality.

BRIEF DESCRIPTION OF THE DRAWINGS

The preferred embodiments of the present invention will be described with reference to the following figures, wherein like numerals designate like elements, and wherein.

DETAILED DESCRIPTION OF PREFERRED EMBODIMENTS

Figure 1:
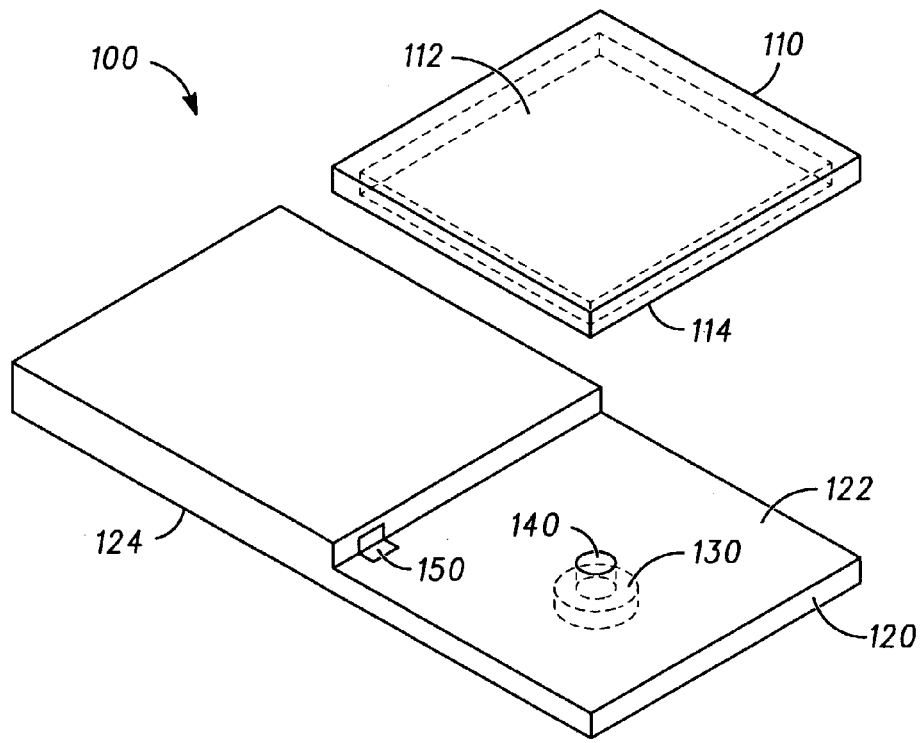
FIG. 1 is an exemplary exploded isometric view of a portable electronic device according to a preferred embodiment.

The present invention can provide an electronic device such as a portable electronic device. The electronic device can include a frame including at least one aperture, the frame having a first side and a second side, an audio source located on the second side of the printed circuit board, and a front housing including a lightguide. The front housing can include a front first side and a back second side opposite the first front side, the back second side facing the first side of the printed circuit board. The front housing and the frame can create an acoustic chamber for the audio source.

The frame can be a printed circuit board. The acoustic chamber can be coupled to the audio source via the at least one aperture. The acoustic chamber can be configured to improve the low frequency response of the audio source. The audio source can include a first multifunction transducer and a second multifunction transducer. The electronic device can also include a keypad coupled to the first side of the front housing, where the keypad can substantially acoustically seal the first side of the front housing.

The electronic device can additionally include a light source coupled to the frame where the front housing can further include a light reception unit that receives light from the light source. The light reception unit can include a cylinder coupled to the front housing, the cylinder optically coupled to the light source and a conical total internal reflection surface optically coupled to the cylinder. The light reception unit can further include at least one leg coupled between the cylinder and the frame where the cylinder and the at least one leg provide support for the front housing on the frame. The electronic device can further include a keypad coupled to the front housing where the light reception unit provides partial support for the front housing on the frame for activation of a key on the keypad. The conical total internal reflection surface can extend partially into the cylindrical structure. The electronic device can also include a keypad, where the conical total internal reflection surface substantially redirects light from the light source to a plurality of keys of the keypad.

The electronic device can additionally include an audio source cover where the audio source has a first side and a second side and where the audio source cover can substantially acoustically isolate the first side from the second side of the audio source. The audio source can operate as a vibrator in a first range of frequencies such as a specific frequency and operate as an audio source in a second range of frequencies.

According to another embodiment, the present invention can provide a mobile communication device. The mobile electronic device can include a frame having at least one aperture, the frame having a first side and a second side, a transducer coupled to the second side of the frame, the transducer having a first side and a second side, a front housing including a lightguide, the front housing coupled to the frame. The front housing can include a front first side and a back second side opposite the first front side, the back second side facing first side of the frame. The front housing and the frame can be acoustically coupled via the aperture.

The front housing and the frame can be substantially acoustically sealed together to create an acoustic chamber for the audio source.

The mobile communication device can also include a transducer housing coupled to the transducer. The transducer housing substantially hermetically seal the first side of the transducer from the second side of the transducer. The mobile communication device can additionally include a light source coupled to the frame. The front housing can further include a light reception unit that receives light from the light source. The light reception unit can include a front housing support structure coupled between the front housing and the frame. The front housing support structure can be optically coupled to the light source and the front housing. The front housing support structure can further include a cylinder coupled to the front housing and at least one leg coupled between the cylinder and the frame where the cylinder and the at least one leg can provide support for the front housing on the frame. The mobile communication device can also include a keypad where the light reception unit can substantially redirect light from the light source to all keys of the keypad.

According to another embodiment, the present invention can provide a mobile communication device that can include a first housing, an audio source, a frame including a first side and a second side, and a second housing coupled to the audio source and the frame. The frame can be coupled to the first housing on the first side to create a acoustic chamber between the frame and the first housing and the audio source can be located on the second side of the frame. The frame can include mobile communication device circuitry and an aperture that acoustically couples the audio source to the first side of the frame. The first housing can be a lightguide.

Thus, among other benefits, the present invention can provide a portable electronic device that efficiently utilizes space for illumination functions. Also, the present invention can also provide a portable electronic device that efficiently utilizes space for an audio source. Additionally, the present invention can provide a portable electronic device that produces desirable audio signal quality.

FIG. 1 is an exemplary exploded isometric view of a portable electronic device 100 according to a preferred embodiment. The electronic device 100 may be a wireless telephone, a cellular telephone, a personal digital assistant, a gaming device, a personal media device such as a personal audio and/or video device, or any other electronic device. Preferably, the electronic device 100 is a mobile communication device such as a portable phone or messaging device. The electronic device 100 can include a front housing 110, a frame 120, an audio source 130, an aperture 140, and a light source 150. The front housing 110 can have a front first side 112 and a back second side 114 opposite the first front side 112. The frame 120 can have a first frame side 122 and a second frame side 124. The back second side 114 of the front housing 110 can face the first frame side 122.

The front housing 110 can act as a lightguide. The light source 150 can be a light emitting diode, a filament-based light source, or any other light source and may be positioned at any useful location for directing light to the front housing 110. The audio source 130 can be positioned on the second frame side 124. The aperture 140 can run from the first frame side 122 to the second frame side 124. The aperture 140 may be of any sufficient size for directing desired audio wavelengths from the audio source 130 through the frame 120. The audio source 130 can be a speaker, a transducer, or any other device useful for generating an audio signal. For example, the audio source 130 can be a multiple function transducer that can generate audio signals in a first frequency band and can act as a vibrator in a second frequency band such as at a specific frequency.

The frame 120 and the front housing may house various components useful for an electronic device. For example, the frame 120 may house a display, a personal speaker, a microphone, input buttons, a keypad, or any other components useful for an electronic device. Also, the entire electronic device 100 may be self-contained. Alternately, the electronic device 100 may comprise the internal components for use with replaceable covers that contain the electronic device 100.

Figure 2:
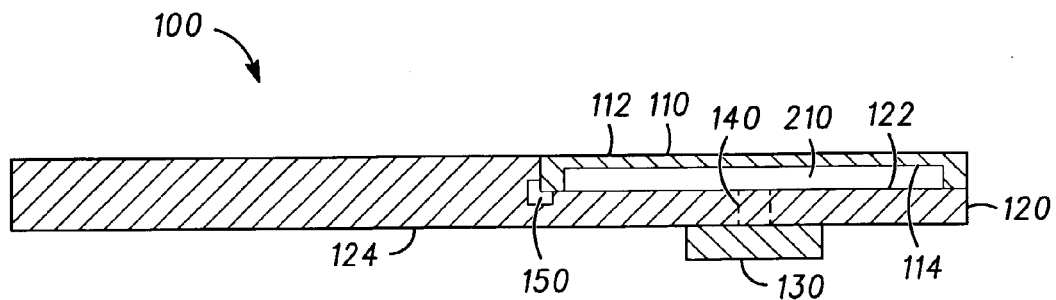
FIG. 2 is an exemplary side view of the electronic device according to a preferred embodiment.

FIG. 2 is an exemplary side view of the electronic device 100 according to a preferred embodiment. When assembled, the electronic device 100 can include an acoustic chamber 210 between the frame 120 and the front housing 110. The acoustic chamber 210 may be an air chamber of sufficient size for enhancing the bass frequencies, or other characteristics of an audio signal generated by the audio source 130. The acoustic chamber 210 may form a second order or higher order system. For example, the acoustic chamber 210 may be substantially acoustically sealed, may be vented, or may be otherwise configured for enhanced audio performance.

In operation, the front housing 110 can receive light from the light source 150 and direct the light to desired portions of the electronic device 100. For example, the front housing can direct light from the light source 150 out of the front first side 112, out of a selected portion of the first front side 112, or to any other location on or out of the electronic device 100. Also, the audio source 130 can generate a signal such as an audible signal. Air can be pushed by the audio source 130 through the aperture 140 into the acoustic chamber 210. The aperture 140 and the acoustic chamber 210 can operate to enhance the signal generated by the audio source 130.

Figure 3:
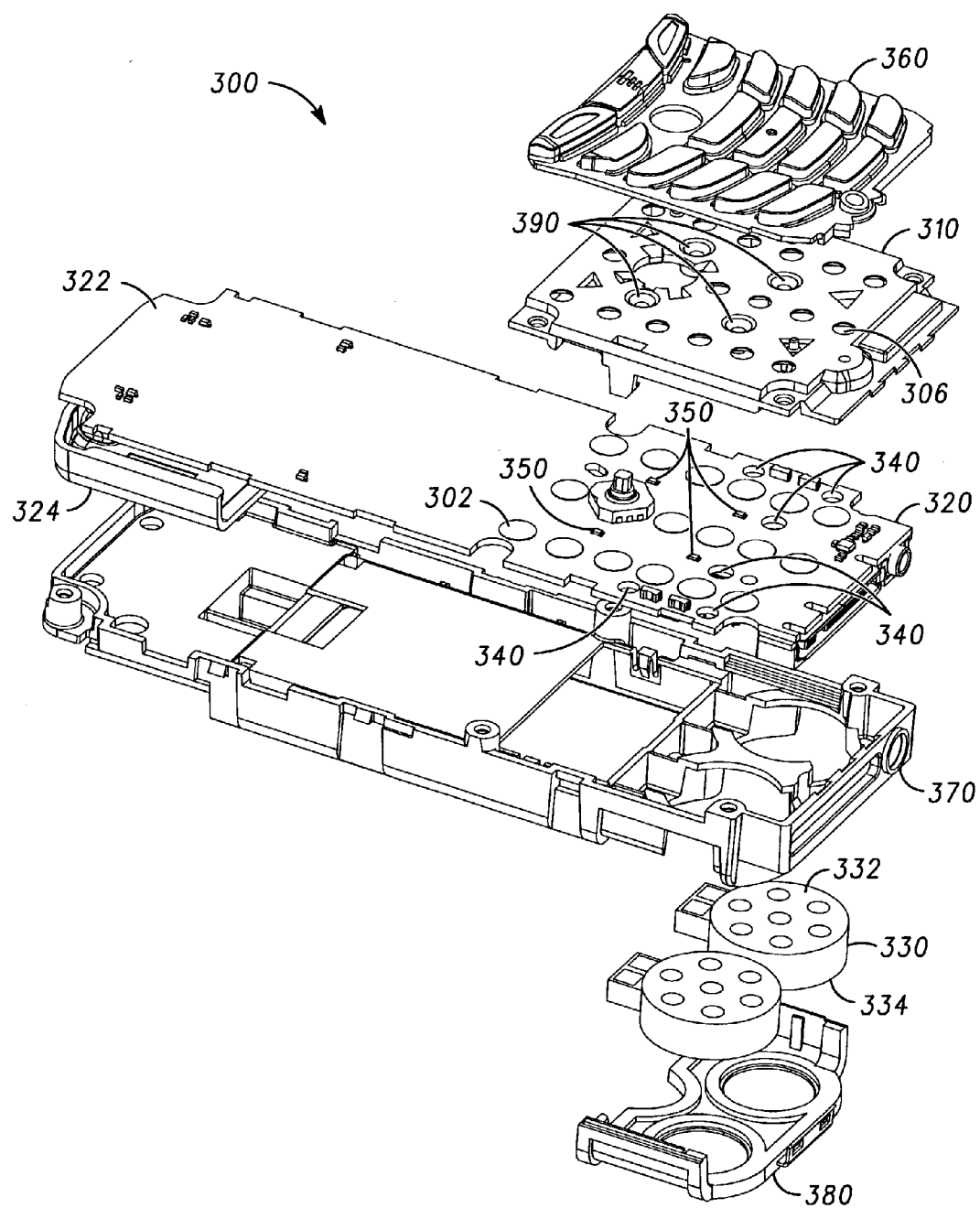
FIG. 3 is an exemplary exploded isometric view of a portable electronic device according to another embodiment.

FIG. 3 is an exemplary exploded isometric view of a portable electronic device 300 according to another embodiment. The electronic device 300 can include at least one keypad pad 302, at least one key light redirector 306, a front housing 310, a frame 320, an audio source 330, at least one aperture 340, at least one light source 350, a keypad 360, a back housing 370, an audio source cover 380, and at least one light reception unit 390. The at least one keypad pad 302 may be an input pad that can receive an input from the keypad 360. Preferably, there is one keypad pad 302 for each key of the keypad 360. The at least one key light redirector 306 may be an optical component that can redirect light to keys on the keypad 360. Preferably, there is one key light redirector 306 for each key of the keypad 360. The front housing 310 may be a lightguide that can receive and channel light from the at least one light source 350. The frame 320 may include electronic device circuitry such as mobile communication device circuitry, gaming circuitry, or any other electronic device circuitry.

The audio source 330 can be a speaker, a transducer, or any other device useful for generating an audio signal. For example, the audio source 130 can be a multiple function transducer that can generate audio signals in a first frequency band and can act as a vibrator in a second frequency band such as at a specific frequency. Preferably, the audio source 330 includes two multiple function transducers. The at least one aperture 340 can acoustically couple audio signals on a second side 324 of the frame 320 with audio signals on a first side 322 of the frame 320. For example, desired frequencies generated by the audio source 330 can pass to the first side 322 of the frame 320 via the at least one aperture 340. According to one embodiment, the frame 320 has six apertures 340 as shown. The at least one light source 350 can be a light emitting diode, a filament-based light source, or any other light source. According to one embodiment, four light sources 350 may be used as shown. The keypad 360 may include function buttons, gaming inputs, phone keys, or any other useful inputs. The back housing 370 can cover the back of the frame 320 and provide support for the audio source 330. The audio source cover 380 can attach to the back housing 370 to cover a portion of the audio source 330. For example, the audio source cover 380 can hermetically seal a first side 332 of the audio source 330 from a second side 334 of the audio source. Thus, sound from the first side 332 of the audio source 330 does not interfere with sound from the second side 334 of the audio source. The at least one light reception unit 390 can be coupled to the at least one light source 350 to receive light from the at least one light source 350. According to one embodiment, one light reception unit 390 is used for each light source 350.

Figure 4:
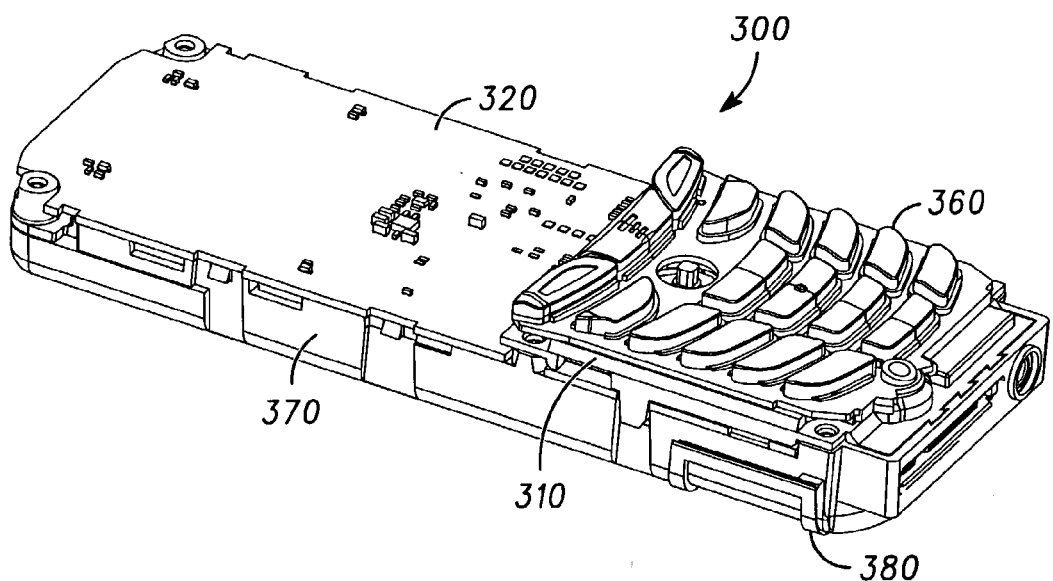
FIG. 4 is an exemplary isometric view of the electronic device according to another embodiment.

FIG. 4 is an exemplary isometric view of the electronic device 300 according to another embodiment. FIG. 4 illustrates the elements of the electronic device 300 assembled into one unit. The keypad 360 can substantially acoustically seal the front housing 310 to create an acoustic chamber between the front housing 310 and the frame 320. Alternately, the front housing 310 can be substantially acoustically sealed without the keypad 360 or some other film or housing may be used to acoustically seal the front housing 310 to create an acoustic chamber between the front housing 310 and the frame 320. For example, the keypad 360 can seal the front housing 310 enough to obtain the desired effects on volume and frequency output of the audio source 330.

Figure 5:
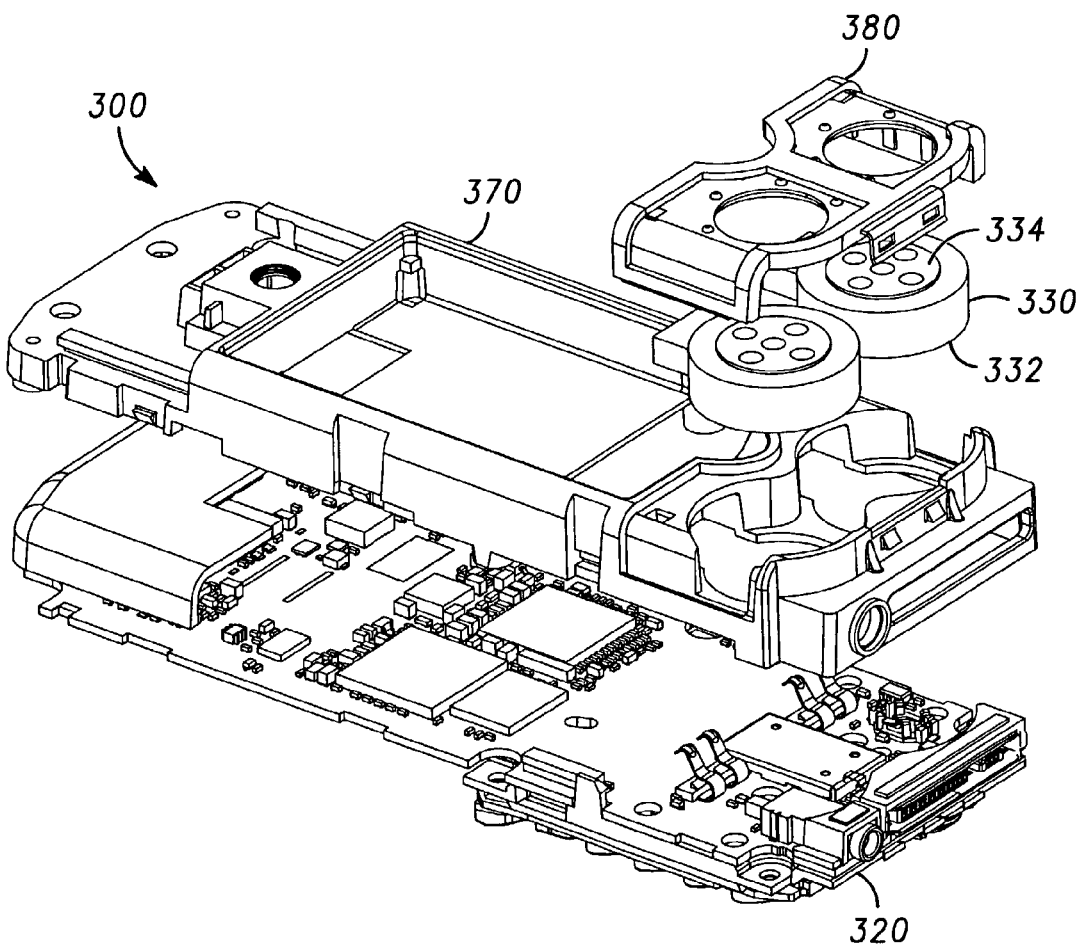
FIG. 5 is an exemplary exploded isometric back view of the electronic device according to another embodiment.

FIG. 5 is an exemplary exploded isometric back view of the electronic device 300 according to another embodiment. As shown, the audio source 330 can fit into specified locations in the back housing 370. The audio source cover 380 may be used to contain the audio source 330. As mentioned, the audio source cover 380 can also acoustically seal one side of the audio source 332 from the other side of the audio source 334 for improved audio performance. Alternately, the audio source 330 may attach directly to the frame 320. Also, the back housing 370 or the frame 320 can be used to acoustically seal one side of the audio source 332 from the other side of the audio source 334. Furthermore, the audio source 330 can operate without such acoustic sealing.

Figure 6:
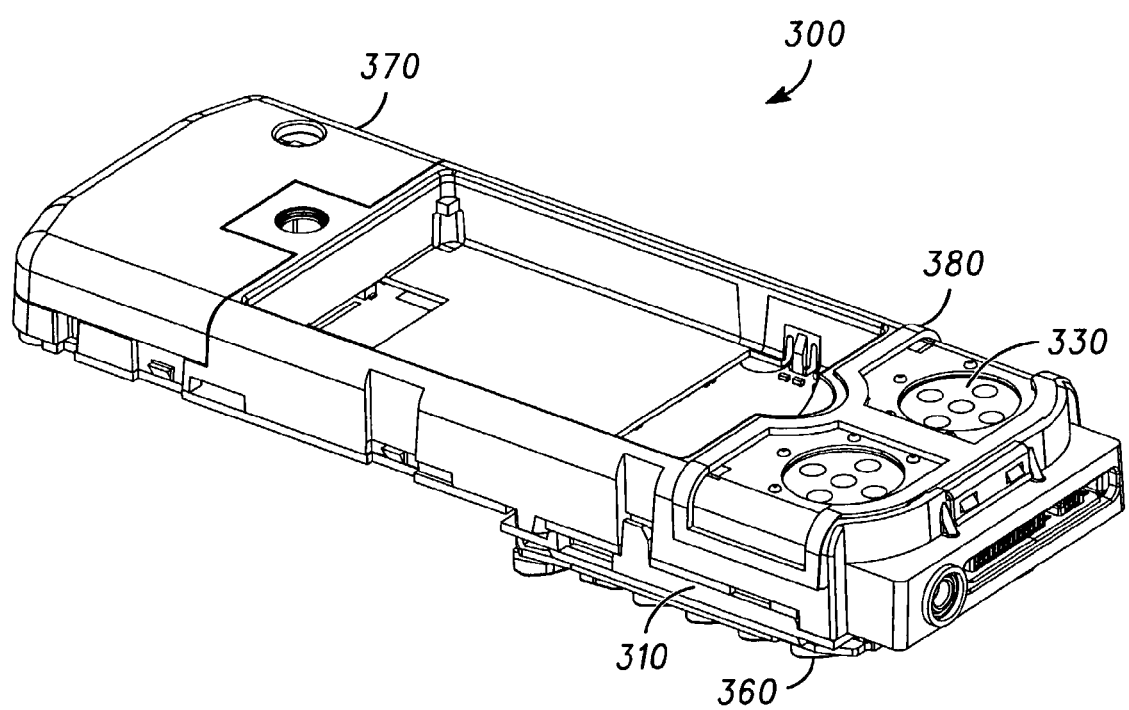
FIG. 6 is an exemplary isometric back view of the electronic device according to another embodiment.

FIG. 6 is an exemplary isometric back view of the electronic device 300 according to another embodiment. FIG. 6 illustrates a back view of the elements of the electronic device 300 assembled into one unit. According to one embodiment, the audio source 330 can include two audio sources, such as two transducers, can be used for improved performance. Also, the two audio sources can operate in stereo. Each audio source cover 380 can assist in directing audio signals to the sides of the electronic device 300 for improved stereo separation. An electronic device cover with side opening may also be used to channel acoustic signals to the sides of the electronic device 300.

Figure 7:
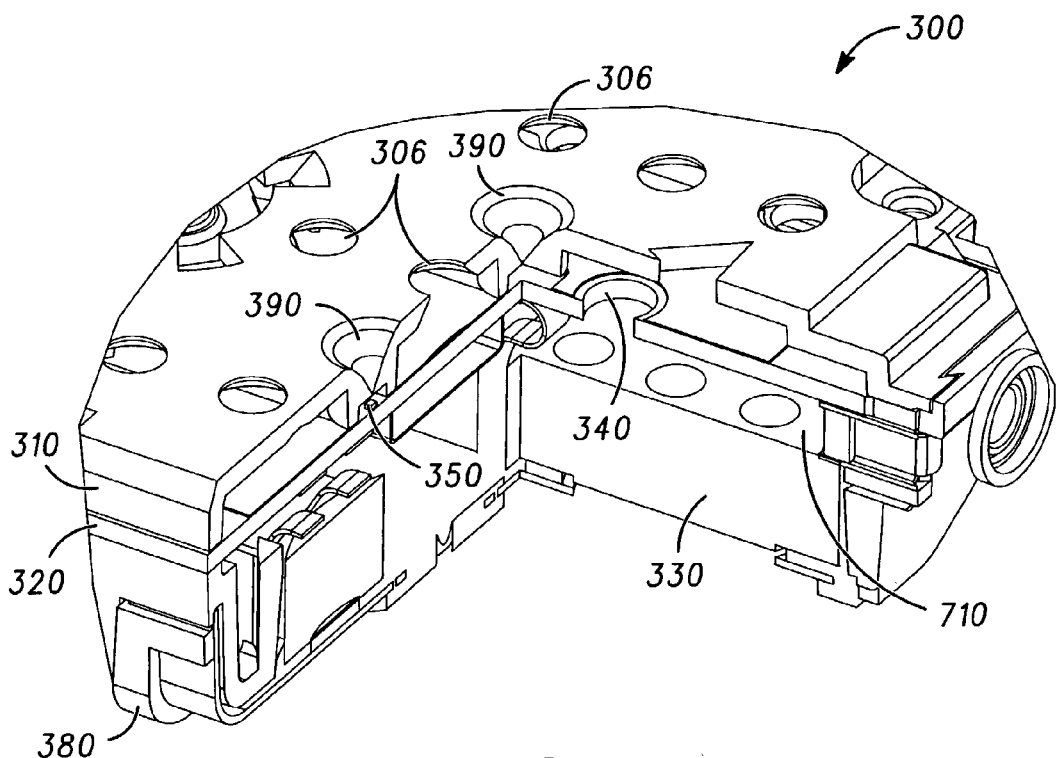
FIG. 7 is an exemplary cross sectional view of the electronic device according to another embodiment.

FIG. 7 is an exemplary cross sectional view of the electronic device 300 according to another embodiment. The electronic device 300 can include an acoustic chamber 710 when assembled. The acoustic chamber 710 can be created by an area between the front housing 310 and the frame 320. In operation, air can be pushed by the audio source 330 through the aperture 340 into the acoustic chamber 710. The aperture 340 and the acoustic chamber 710 can operate to enhance a signal generated by the audio source 330.

For example, the audio source 330 can include a pair of 18 mm multi-function transducers in an acoustic suspension system. The front of the transducers can fire into a pair of slots at the side of the audio source cover 380 that direct the pressure to the sides of the electronic device 300. This can improve stereo separation for better stereo effect and imaging. This can also provide mass loading. In particular, air in front of the transducer diaphragms do not move as easily, which appears to add mass to the transducer's diaphragms. This mass loading can lower resonance and thus, increase bandwidth, i.e. increase bass. There is an increase in bass because, while there may be more energy at the lower frequencies, there is also less energy at the higher frequencies, so the relative balance favors the bass.

Compared to a single transducer, a second transducer can offer 3 dB more output for the same total input power, and 6 dB more output if both transducers are fed the power of the single transducer. If both transducers go into the same volume as the single transducer, system resonance can increase by some amount depending on this volume and the transducer's compliance. In order to maintain the same system resonance as the single transducer, the volume must double.

The audio source cover 380 can act as a baffle for the audio source 330, separating the front pressure wave from the rear pressure wave of the audio source 330. The volume on the frame side of the audio source 330 does not stop at the frame side. According to one embodiment, the volume can continue through the frame 320 via apertures 340 totaling roughly 40 square millimeters and then into the acoustic chamber 710.

Preferably, the apertures 340 are large enough to improve the operation of the combination of the audio source 330 and the acoustic chamber 710. For example, if apertures 340 are too small, they may behave with mass and resistance, and the volume of the acoustic chamber 710 may not act as one volume with a volume in the audio source 330. Thus, the apertures 340 may be distributed over as large of an area as possible. Also, a large cross sectional area of the frame side of the air chamber 710 compared to the thickness of the apertures 340 can result in the apertures 340 having less resistance and less mass for the desired effect. As a result, the volume of the acoustic chamber 710 and the volume in the audio source 330 can operate basically as one volume. As an example performance increase, the inclusion of the acoustic chamber 710 volume can improve the low frequency response by at least ⅓ octave, which is a significant audible improvement.

Figure 8:
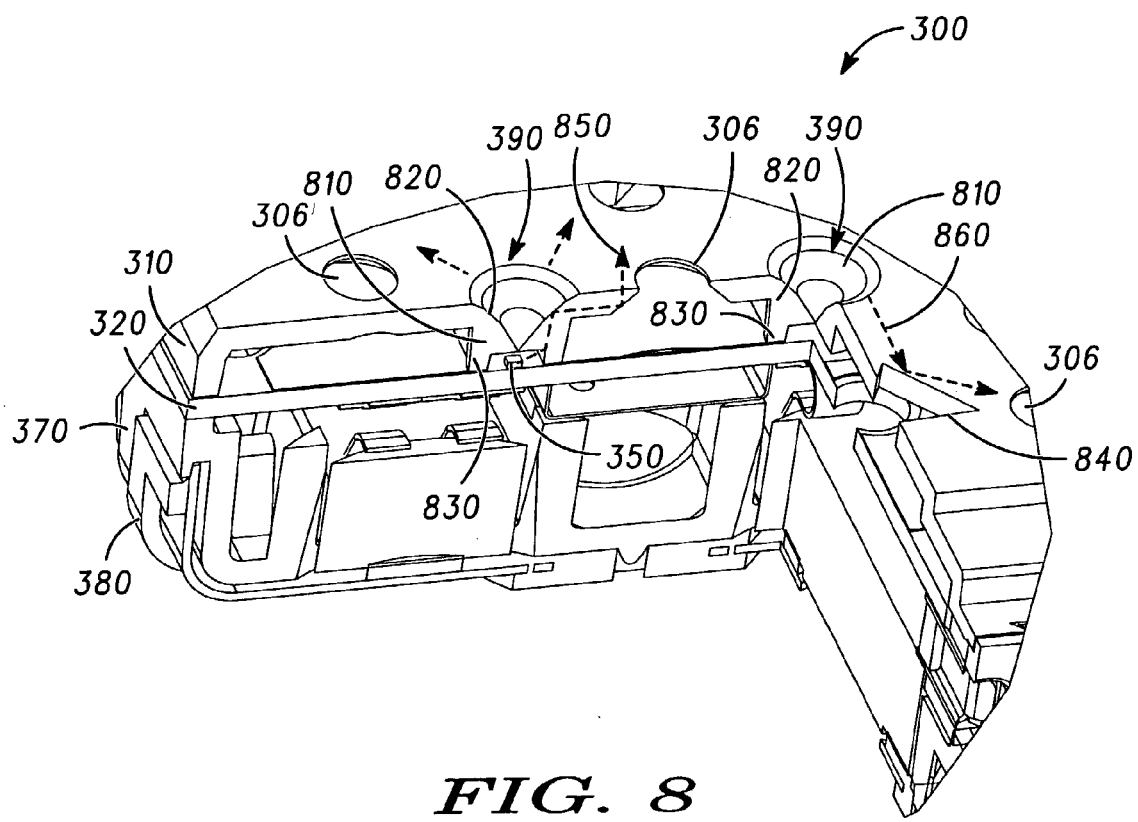
FIG. 8 is another exemplary cross sectional view of the electronic device according to another embodiment.

FIG. 8 is another exemplary cross sectional view of the electronic device 300 according to another embodiment. The light reception unit 390 of the electronic device 300 can include a cylinder 810, a cone 820, and at least one leg 830. The electronic device 300 can also include triangular cuts 840 in the front housing. The cylinder 810 can be positioned to receive light from the light source 350. The cone 820 can be a conical total internal reflection surface and can extend partially into the cylinder 810 for improved light distribution throughout the front housing 310. The at least one leg 830 can be positioned on the frame 320 side of the front housing 310. The at least one leg 830 can include two or more legs which substantially surround the light source 350. The at least one leg 830 may also be a cylinder surrounding the light source 350. Thus, the at least one leg 830 may assist in directing light rays from the light source 350 into the cylinder 810. The combination of the at least one leg 830 and the cylinder 810 can act as standoffs for providing support for the front housing 310 on the frame 320.

In operation, the light source 350 can emit light 850. The at least one leg 830 and the cylinder 810 can channel the light 350 to the cone 820. The cone 820 can then redirect the light 850 through the front housing 310. When the light reaches a key light redirector 306, the light can be reflected perpendicular to a face of the frame 310 to a key on the keypad 360 or to any other location that requires light. The triangular cuts 840 can assist in redirecting light 860 to key light redirectors 306 remote from the light source 850.

While this invention has been described with specific embodiments thereof, it is evident that many alternatives, modifications, and variations will be apparent to those skilled in the art. For example, various components of the embodiments may be interchanged, added, or substituted in the other embodiments. As one example, various selected components of the electronic device 300 may be added to the electronic device 100. Accordingly, the preferred embodiments of the invention as set forth herein are intended to be illustrative, not limiting. Various changes may be made without departing from the spirit and scope of the invention.

What is claimed is:

1. A portable electronic device, comprising:
   a frame including at least one aperture, the frame having a first side and a second side, the aperture running from the first side to the second side;
   an audio source located on the second side of the frame; and
   a front housing including a lightguide, wherein the front housing comprises a front first side and a back second side opposite the first front side, the back second side facing the first side of the frame, wherein the front housing and the frame create an acoustic chamber for the audio source.

2. The portable electronic device according to claim 1, wherein the frame comprises a printed circuit board,
   wherein the acoustic chamber is coupled to the audio source via the at least one aperture, and
   wherein the acoustic chamber is configured to improve the low frequency response of the audio source.

3. The portable electronic device according to claim 1, wherein the audio source comprises:
   a first multifunction transducer; and
   a second multifunction transducer.

4. The portable electronic device according to claim 1, further comprising a keypad coupled to the first side of the front housing, the keypad substantially acoustically sealing the first side of the front housing.

5. The portable electronic device according to claim 1, further comprising a light source coupled to the frame,
   wherein the front housing further includes a light reception unit that receives light from the light source.

6. The portable electronic device according to claim 5, wherein the light reception unit comprises:
   a cylinder coupled to the front housing, the cylinder optically coupled to the light source; and
   a conical total internal reflection surface optically coupled to the cylinder.

7. The portable electronic device according to claim 6, wherein the light reception unit further comprises at least one leg coupled between the cylinder and the frame, and
   wherein the cylinder and the at least one leg provide support for the front housing on the frame.

8. The portable electronic device according to claim 6, further comprising a keypad coupled to the front housing,
   wherein the light reception unit provides partial support for the front housing on the frame for activation of a key on the keypad.

9. The portable electronic device according to claim 6, wherein the conical total internal reflection surface extends partially into the cylindrical structure.

10. The portable electronic device according to claim 6, further comprising a keypad,
    wherein the conical total internal reflection surface substantially redirects light from the light source to a plurality of keys of the keypad.

11. The portable electronic device according to claim 1, further comprising an audio source cover,
    wherein the audio source comprises a first side and a second side, and
    wherein the audio source cover substantially acoustically isolates the first side from the second side of the audio source.

12. The portable electronic device according to claim 1, wherein the audio source operates as a vibrator at a first frequency and operates as an audio source in a second range of frequencies.

13. A mobile communication device, comprising:
    a frame including at least one aperture, the frame having a first side and a second side;
    a transducer coupled to the second side of the frame, the transducer having a first side and a second side; and
    a front housing including a lightguide, the front housing coupled to the frame wherein the front housing comprises a front first side and a back second side opposite the first front side, the back second side facing first side of the frame, wherein the front housing and the frame are acoustically coupled via the aperture, and wherein the front housing and the frame are substantially acoustically sealed together to create an acoustic chamber for the audio source.

14. The mobile communication device according to claim 13, further comprising a transducer housing coupled to the transducer, the transducer housing substantially hermetically sealing the first side of the transducer from the second side of the transducer.

15. The mobile communication device according to claim 13, further comprising a light source coupled to the frame,
    wherein the front housing further includes a light reception unit that receives light from the light source.

16. The mobile communication device according to claim 13, wherein the light reception unit comprises:
    a front housing support structure coupled between the front housing and the frame, the front housing support structure optically coupled to the light source and the front housing.

17. The mobile communication device according to claim 16, wherein the front housing support structure further comprises:
    a cylinder coupled to the front housing; and
    at least one leg coupled between the cylinder and the frame,
    wherein the cylinder and the at least one leg provide support for the front housing on the frame.

18. The mobile communication device according to claim 15, further comprising a keypad, wherein the light reception unit substantially redirects light from the light source to all keys of the keypad.

19. A mobile communication device, comprising:
a first housing;
an audio source;
a frame including a first side and a second side, the frame coupled to the first housing on the first side to create a acoustic chamber between the frame and the first housing, the audio source located on the second side of the frame, the frame comprising:
mobile communication device circuitry; and
an aperture that acoustically couples the audio source to the first side of the frame; and
a second housing coupled to the audio source and the frame.

20. The mobile communication device according to claim 19, wherein the first housing comprises a lightguide.

* * * * *